Nov. 24, 1970     J. P. CORBETT     3,541,849
OSCILLATING CRYSTAL FORCE TRANSDUCER SYSTEM
Filed May 8, 1968     3 Sheets-Sheet 1
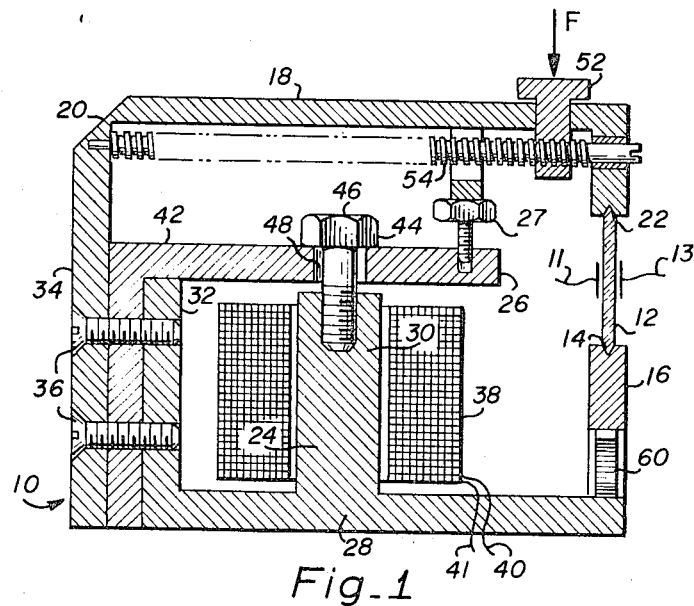
Fig_1
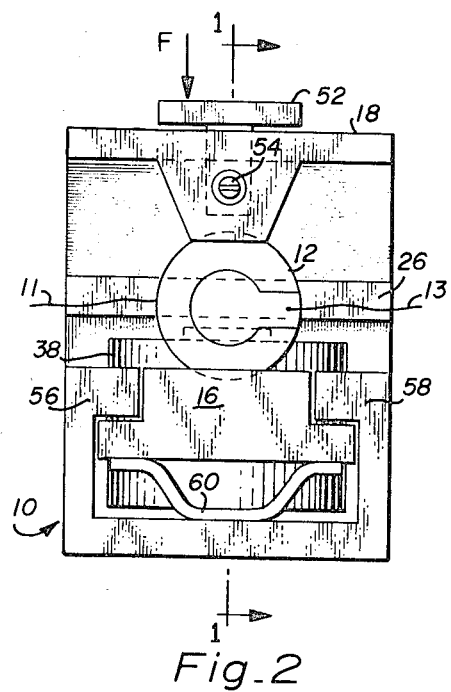
Fig_2
INVENTOR
JAMES P. CORBETT
BY
ATTORNEY

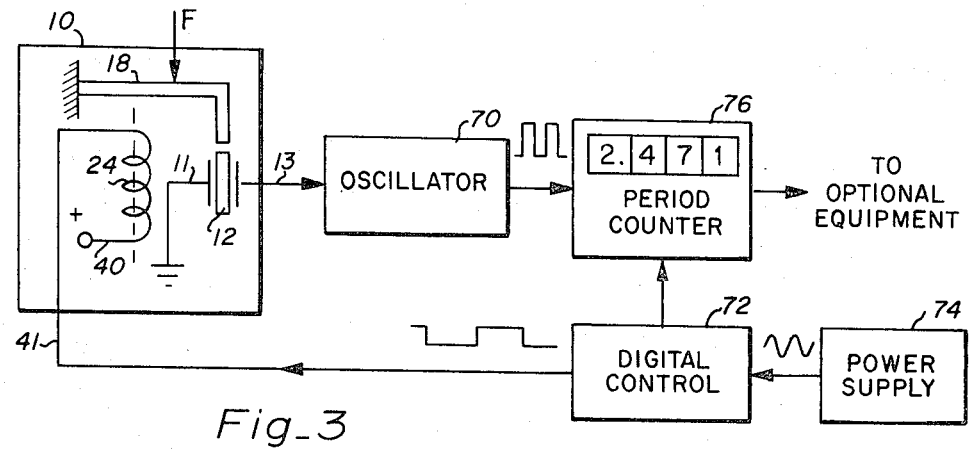
Fig_3
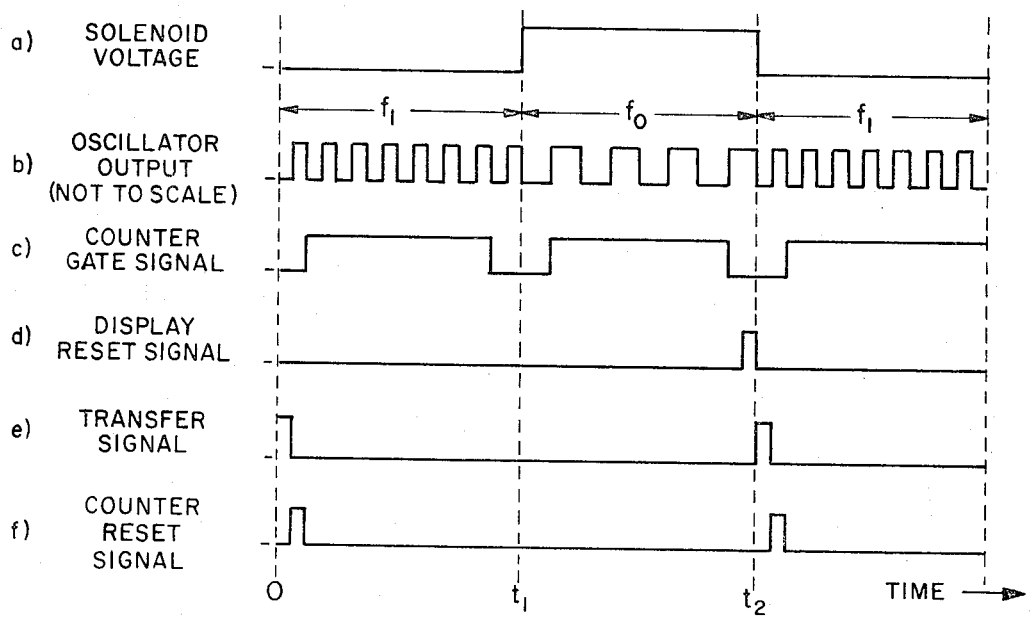
Fig_5
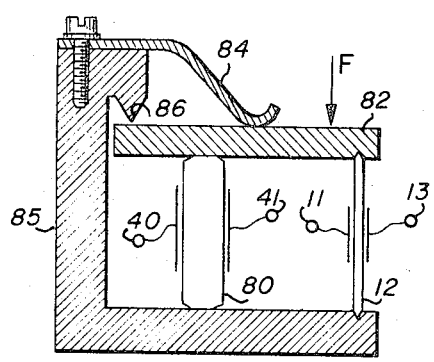
Fig_6
INVENTOR
JAMES P. CORBETT

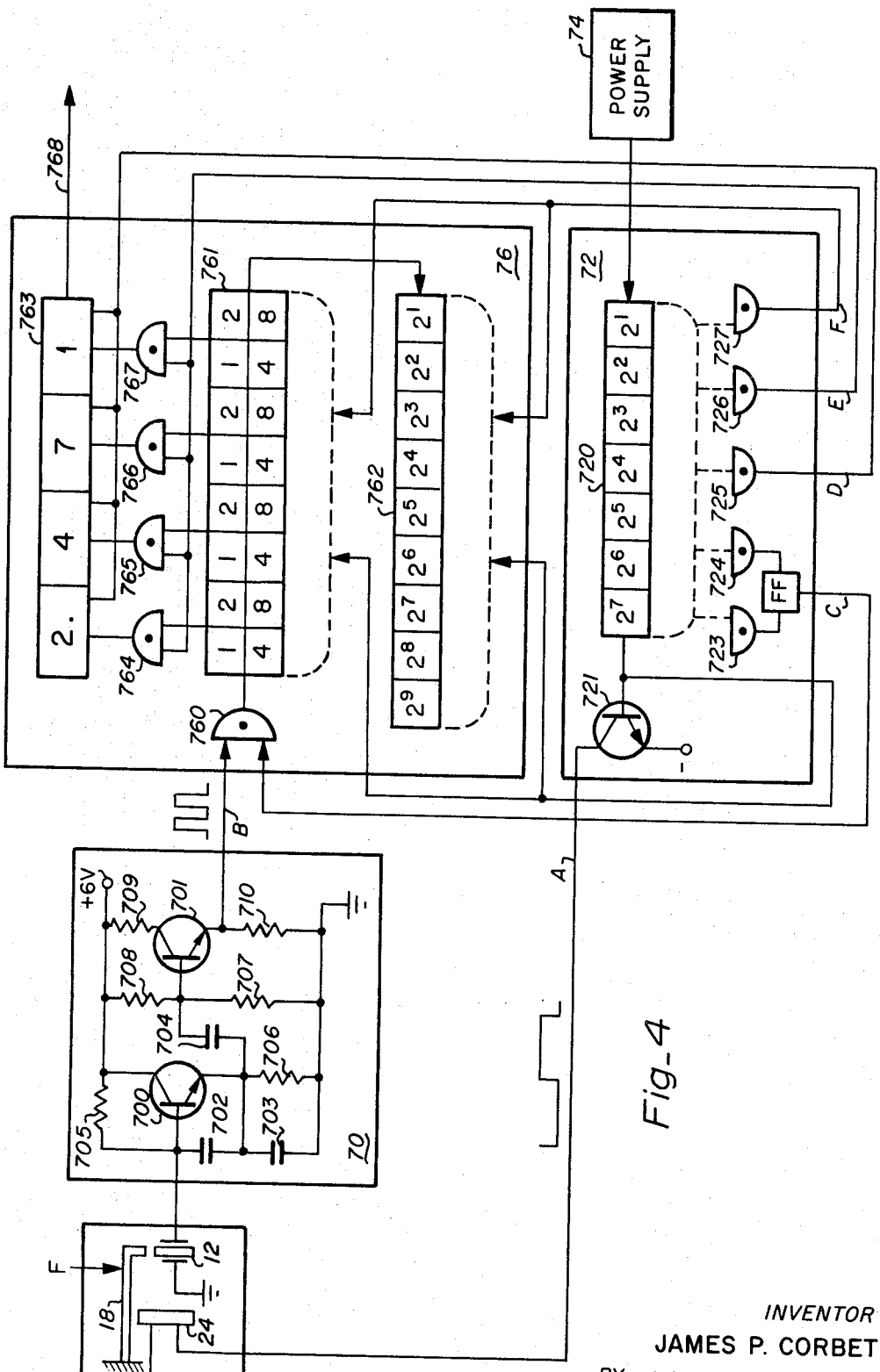
Fig_4

United States Patent Office 3,541,849
Patented Nov. 24, 1970

3,541,849
OSCILLATING CRYSTAL FORCE
TRANSDUCER SYSTEM
James P. Corbett, 1841 Hamilton Ave.,
Palo Alto, Calif. 94303
Filed May 8, 1968, Ser. No. 727,567
Int. Cl. G01e 1/10
U.S. Cl. 73—141          13 Claims

ABSTRACT OF THE DISCLOSURE

An improved force transducer and force transducer system employing the electrical frequency change brought about by controlled application and removal of force or weight to a quartz or other piezoelectric crystal which is maintained in a state of oscillation by an electrical oscillator circuit. The transducer, when stressed by an unknown force, provides changes in pulse rate output of the oscillator which are measured by a reversible period counter, the output of which may be displayed or used for digital computation purposes. Using the disclosed transducer system, any unknown force or change in force may be measured with great accuracy.

BACKGROUND OF THE INVENTION

Field of the invention

This invention generally relates to a means for performing the accurate measurement of force or weight by using the electrical frequency changes brought about by the controlled application and removal of forces to a quartz or other piezoelectric crystal, maintained in a state of oscillation by an electrically resonant circuit to provide a digital signal and numerical indication of such force or weight. The invention has particular application in various types of weighing apparatus, pressure measuring devices and integrating accelerometers.

Description of the prior art

Most prior art force transducing systems are of the type which produce an output in the form of a steady or fixed-frequency voltage or current, the amplitude of which is proportional to the forces applied to them. In general, such prior art devices have included transducers which make use of the electromechanical properties of certain materials known as the piezoelectric effect or the magnetostrictive effect. In the past these types of devices, because of the nature of the output signal, have typically been subject to inaccuracies due to the inherent characteristics of other elements in the system into which the transducing devices are incorporated. An appropriate example is the inaccuracy of indication due to transmission loss which usually results when the output signal is transmitted over a distance or over different distances simultaneously. Such inaccuracies can be directly attributed to the electrical losses in the transmission medium.

In order to avoid these disadvantages other transducing devices have been utilized which function as a result of induced changes in a particular parameter of an electrical circuit. Such devices include transducing elements of which the resistance, inductance or capacitance is altered by an applied force. These types of devices, however, generally require special additional circuits and components in order to produce an output of a form suitable for use in modern transmission systems. Such additional circuits and components may themselves give rise to certain inaccuracies between the forces measured and the data transmitted.

Still another attempt in the prior art to avoid the aforementioned problems has been to employ means for heterodyning a force, responsive variable frequency, with a fixed frequency to provide a sideband frequency which is proportional to the applied force. Such a system is incorporated in the digital accelerometer system disclosed in U.S. Pat. No. 3,033,043 to Arthur J. Runft. These types of systems have generally proven unsatisfactory, however, because of the difficulties resulting from frequency drift in the oscillators due to thermal conditions and aging effects.

Whereas in the prior art devices certain inherent difficulties have been encountered, it has been found that these difficulties can be overcome by providing a system which produces a pulse rate or frequency difference output which is free from the inaccuracies brought about by external circuits. An output in the form of a pulse rate or frequency difference, as opposed to the steady voltage or current type output, has been found to be desirable for at least the following reasons. Firstly, by present day digital counting techniques the frequency changes may be measured and numerically displayed; secondly, such digital outputs may readily be used for digital computation or control purposes; and thirdly, the signals may be telemetered without the transmission losses to which direct current signals are subject.

SUMMARY OF THE INVENTION

The invention pertains to a device for precisely measuring weight or force and for providing a digital signal and numerical indication of the value of such weight or force. The applied force may have a fixed value over a wide range of possible values or it may be varying with respect to time. In the present invention a quartz crystal of the type used in quartz crystal oscillators is arranged so that the force to be measured is applied across its edges in a compressional manner although the force could equally as well be applied in a tensile manner. A force applied in this way and at a certain angle to the azimuthal axis of the crystal produces a significant change in the frequency of the oscillation of the crystal. This feature is used in the present invention to measure the amplitude of the force by arranging the armature of a solenoid to oppose the force and periodically remove it completely from the crystal so that the natural frequency of the crystal in its unloaded state as well as the loaded frequency of the crystal when subjected to a given force may be alternately detected. The two frequencies are then measured and differenced by a digital period counter, and the digital difference is numerically displayed as a direct and accurate measure of the unknown applied force.

To provide rapid measurement of changes in the force, the solenoid is fed from a low frequency power source and, according to further features of the invention, a method of calibration and scale change is described. A means of overload protection is also provided to prevent damage to the quartz crystal. The use of piezoceramic or magnetistrictive material is also indicated as an alternative to the use of the solenoid to effect force removal from the crystal.

OBJECTS OF THE INVENTION

It is therefore a principal object of the present invention to provide an improved transducing system which produces an inherent pulse-rate or frequency-difference output which can be transmitted independent of external circuit-caused inaccuracies.

Another object of the present invention is to provide an improved force transducing element for use in a transducing system.

Still another object of the present invention is to provide an improved force transducing element for use in an improved transducing system of the type described and which exhibits a high degree of linearity and accuracy.

BRIEF DESCRIPTION OF THE DRAWINGS

FIG. 1 is a longitudinal section through a transducing device in accordance with the present invention;

FIG. 2 is an end view of the device shown in FIG. 1;

FIG. 3 is a block diagrammatic representation of a transducing system in accordance with the present invention;

FIG. 4 is a more detailed schematic diagram of the transducing system shown in FIG. 3;

FIG. 5 is a simplified timing diagram illustrating the operation of the system shown in FIG. 4; and FIG. 6 illustrates an alternative transducing device in accordance with the present invention.

DESCRIPTION OF THE PREFERRED EMBODIMENT

Referring now to FIGS. 1 and 2 of the drawing, there is shown a force measuring device 10 including a quartz crystal 12, having leads 11 and 13, mounted in a recess 15 in the upper surface of a support platform 16; a non-magnetic force applying arm 18 one end of which is pivoted about a line 20 and the other end of which includes a recess 22 for receiving the top edge of the crystal 12; and a solenoid 24 having an armature 26 with an adjustable leg member 27 for supporting arm 18 so as to prevent any force from being applied to crystal 12 through the arm 18 when solenoid 24 is not energized.

The solenoid 24 includes a yoke member 28 of magnetic material, the lower portion of which serves as a base for the device 10. The yoke 28, in addition to the center pole 30, also includes an upturned side member 32 to which the armature 26 and a means 34 for supporting the pivoted end of arm 18 are fastened by means of screws 36.

The solenoid coil 38, when energized through leads 40 and 41, causes the armature 26 to be displaced downwardly bending about the point 42, thus removing the support for arm 18 and allowing a proportion of a force F to be transmitted through arm 18 to crystal 12. A bolt 46 made of a non-magnetic material such as stainless steel or brass is passed through a hole 48 in the armature 26, and is threaded into the end of center pole 30. The bolt 46 is adjusted so that the head 44 limits the upward travel of the armature 26, and holds it in a predetermined position when the solenoid is de-energized.

Although the applied force F may be transmitted to arm 18 at any point along its length, it is often desirable to provide a means whereby the point of application can be controlled. In the present embodiment a moveable force receiving platform 52 is provided, an appendage of which extends through a slot cut lengthwise along the arm 18, and a lead screw 54 for controlling the movement thereof is provided as shown in FIGS. 1 and 2. Using the familiar leverage principles, the actual force applied to the crystal can be reduced to within a predetermined range by positioning the platform at a suitable point along the arm 18.

The effect of such a feature is to increase the force measuring capacity of the transducer beyond that which could be borne by the crystal alone. Thus, the relationship between the crystal frequency change $\Delta f$ and the applied force F can be expressed as:

$$\Delta f = 1/L \cdot F$$

where 1 is the distance between the pivot point 20 and the center of the platform 52, and L is the distance between the pivot point 20 and the point of application of the force to the crystal. This adjustment has a secondary advantage in that a force-applying point can be selected along the length of arm 18 whereby the relationship between F in conventional units may be selected to be a readily compatible multiple of $\Delta f$ measured in Hertz.

Referring now specifically to FIG. 2, there is shown an additional feature which may be incorporated into the device as a safety precaution. This feature is a simple mechanical overload means for preventing the crystal 12 from receiving damage due to an excessive force applied to the crystal. The overload device consists of the platform 16 which is forced upward against the turned-in lips 56 and 58 of the yoke assembly by a spring 60, this force being the limiting force to which it is desired that the crystal 12 be subjected.

In FIG. 3 of the drawing, a preferred embodiment of a transducing system in accordance with the present invention is shown in block diagram form. The system includes a transducing device 10 which may take the form of that previously described, or any other suitable form, several alternatives of which will be suggested hereinafter.

As shown in the drawing, one side of crystal 12 is connected to ground via lead 11, and the other is connected to an oscillator 70 by lead 13. Because of the possible error which may result from the capacitance of the lead 13, it is generally desirable that the oscillator 70 be placed as close as possible to the crystal 12. The oscillator 70 may be of any desired circuit configuration depending on the desired frequency range and other operating characteristics. Lead 40 of solenoid 24 is connected to the output of a digital control means 72 which converts the output of power supply 74 into a pulsed signal of suitable frequency for application to solenoid 24.

As solenoid 24 is thus alternately energized and at a frequency which may, for example, be 0.5 hertz, the force applying arm 18 is periodically displaced downwardly in such a manner as to periodically cause the force F to be transmitted through arm 18 to crystal 12. The effect then of such operation is to alternately cause the output of the oscillator 70 to alternate between the uncompressed natural frequency of the crystal 12 and a second frequency which is the compressed natural frequency of the crystal 12, the change in frequency being proportional to the force F which is applied to the transducer 10. As an example of the effect which the force F has on the output of the oscillator, it has been found that a 6.3 megahertz fundamental mode, AT cut, quartz crystal of the type normally used in crystal oscillators will exhibit a linear change in frequency with a sensitivity of 286 hertz per pound when a compressional force is applied across its edges and along the crystallographic axis.

The output of the oscillator 70 is connected to the input of a suitable digital counter 76 which measures the difference between the output frequencies of the oscillator 70, as the crystal 12 is loaded and unloaded, and displays this difference as a numerical indication of the force F. One such counter, which is suitable for use in the present system, is the Model 100A manufactured by Monsanto Electronics of West Caldwell, N.J. A suitable alternative is the bidirectional counter Model CF–500R manufactured by Anadex Instruments, Inc. of Van Nuys, Calif. Additionally, an output of the counter 76 may be supplied to additional computational equipment or be telemetered to a remote point.

Turning now to FIG. 4, the entire transducing system is shown in a more detailed schematic representation. As previously described, the power supply 74, which may be of any suitable form which provides a stable output frequency, typically is a source of alternating current of, for example, 60 hertz. The output of power supply 74 is supplied to a digital control means 72 including a divider network 720 which divides down the frequency of the input signal from power supply 74 to a frequency which may be, for example, 0.5 hertz. The 0.5 hertz signal is then amplified by a power transistor 721 and is supplied via lead 41 to the windings of solenoid 24 of transducer 10 which, by causing the downward displacement of the arm 18, periodically causes the unknown force F to be transmitted to the crystal 12.

As the crystal 12 is periodically stressed, the output of the oscillator 70 is caused to alternate between the natural frequency of the crystal 12 and another frequency which is varied from the natural frequency by an amount proportional to the stress applied to the crystal 12 by force F acting through arm 18. In one example, the crystal may be a 5 megahertz AT cut quartz crystal, and the oscillator 70 may be of the two transistor configuration shown wherein the various components have the following values:

| | |
|---|---|
| 700 | NPN transistor 2N918. |
| 701 | NPN transistor 2N1711. |
| 702 | 1300 pf. capacitor. |
| 703 | 75 pf. capacitor. |
| 704 | 250 pf. capacitor. |
| 705 | 220K ohm resistor. |
| 706 | 1K ohm resistor. |
| 707 | 2.7K ohm resistor. |
| 708 | 8.2K ohm resistor. |
| 709 | 3.9K ohm resistor. |

The output of the oscillator 70 is fed through the logic gate 760 of the period counter 76 into a binary coded decimal counter 761 which overflows into a binary counter 762. The display 763 is connected to decimal counter 761 through gates 764, 765, 766 and 767. The logic gates 760, 764, 765, 766, 767, the decimal indicator 763, the decimal counter 761, and the binary counter 762 are all controlled, in accordance with normal computing techniques, by the logic supplied by the gates 723, 724, 725, 726 and 727 of control means 72 which are connected as shown in the drawing.

Referring now to FIGS. 4 and 5, wherein A–F of FIG. 4 correspond to parts $a$–$f$ of the timing diagram shown in FIG. 5, the operation of the system will be described. As shown at (a) in FIG. 5, a voltage is initially supplied to solenoid 24 removing the support from arm 18 and allowing the unknown force F to be transmitted through the arm 18 to crystal 12. As a result, the oscillator 70 produces an output of frequency $f_1$, which is higher than the unloaded natural frequency $f_0$ of the crystal 12 by an amount proportional to the force F. During the time that the force F is applied to the crystal, the counters 761 and 762 count in a count-up mode. At time $t_1$, which is dependent on the period of the output of control means 72, the solenoid 24 is deenergized as indicated in (a) of FIG. 5. This removes force F from its effect on crystal 12, and the oscillator produces an output of frequency $f_0$ which is the natural frequency of the crystal. During this period while the force is removed from the crystal, the counters 761 and 762 count in a countdown mode.

At time $t_2$, the solenoid is again energized and the force F is allowed to influence the output frequency of the oscillator 70 and the counting process is repeated. Thus, the residual number shown in display 763 is proportional to the change in frequency $\Delta f = f_1 - f_0$ between the loaded and unloaded states of crystal 12, and is, accordingly, a direct measure of the force F applied to the transducer 10.

It is to be understood, of course, that in addition to the indication provided by display 763, means may be provided, as indicated by output 768, whereby the indicated information regarding the force F may be telemetered to a remote point after a scanning of the contents of display 763 using well-known digital computation techniques.

While one preferred embodiment of the force transducing element 10 has been described in detail as using a solenoid 24 to periodically allow the applied force F to exert its force on the crystal 12, it will be apparent that other electromechanical means may be used in place of the solenoid. Furthermore, it is likewise apparent that instead of being arranged to periodically allow the force F to exert its force on crystal 12, the solenoid or other electromechanical means could be used to periodically remove or reduce the force applied to crystal 12. One embodiment of such a means is shown in FIG. 6, and includes a piezoceramic or magnetostrictive element 80 which expands to lift the force transmitting arm 82 from the crystal 12 as the periodic energizing signal from counter 72 is applied thereto in accordance with well-known principles regarding piezoelectric and magnetostrictive force applying structures. A spring means 84 secured to platform 85 is provided for causing the arm 82 to pivot about point 86 when transducer 80 is energized.

Another possible means which may be substituted for the solenoid 25 is the piezoelectric bimorph block or bender type force transducer which is manufactured by Gulton Industries, Inc. of Metuchen, N.J. In this device a potential applied across the piezoceramic laminate causes the laminate to bow, thus converting electrical energy to mechanical. After having read this specification, it will be apparent that an endless number of variations could be made to the transducing structure disclosed in FIGS. 1 and 2, and, accordingly, such other specific embodiments will not be disclosed here in detail.

A further embodiment of the invention includes a permanent seismic proof mass arranged to apply a force to the transducer of FIG. 1 to form an accelerometer. This arrangement has a particular advantage in that the numerical data so obtained and processed by means similar to those shown in FIGS. 4 and 5 may readily be numerically integrated by well-known digital logic means to cause the system to measure distance of travel of the transducer.

Yet a further embodiment employs a flexible diaphragm bellows or similar means in the side of a pressure vessel to apply a force proportional to fluid pressure to the transducer, thereby enabling remote numerical indication of fluid pressure. Such an embodiment would have utility as an altimeter or fluid depth measuring instrument.

The invention has been described by referring to a quartz crystal subject to compressional forces. Arrangements will likewise be evident whereby similar transducers may be constructed in which the crystal is subjected to tension forces.

The invention has been described by referring to an arrangement in which excitation of a solenoid causes some proportion of the force to be measured, to be applied to the crystal. It will be evident that excitation of the solenoid could alternatively be arranged to remove only some proportion of the force to be measured from the crystal, thereby producing a similar system performance to the one heretofore described.

Yet a further embodiment will be apparent by extending lever arm 18 of FIG. 1 and suitably modifying the assembly to allow the ratio $1/L$ to become greater than unity thereby permitting accurate measurement of very small forces.

A further embodiment of the principle described employs a quartz crystal caused to resonate in one of its overtone modes; for example, in the third harmonic mode. This has been found to cause the transducer to provide significantly larger frequency versus force sensitivity.

The transducer has been described with reference to quartz as the oscillator material. It is well-known that Rochelle salt, tourmaline and other piezoelectric materials may be caused to resonate in a similar manner.

A further feature which is desirable in some practical applications of the invention is to provide a small pod of hard solder or similar material, or precious metal, sputtered onto the crystal surface in the small area where the force is applied. This spreads the load and reduces the stress which would otherwise occur in the crystal around the application point of the force. Pads of epoxy resin secured to the crystal in the areas of application of the force may be used as alternatives to the sputtered metal and solder.

In a further embodiment of the invention, the quartz crystal alone or the complete transducer of FIGS. 1 and 2 is contained in a vacuum enclosure having a diaphragm at one end to enable the force to be measured to be transmitted to the crystal. This allows the Q of the crystal to be substantially higher than it would otherwise be, therefore improving the accuracy of the system for reasons which are well established in quartz crystal oscillator technology.

A further means of increasing system accuracy is achieved by thermostatically controlling the crystal temperature. This may be effected by a separate temperature control system applied to the crystal or by thermostatically controlling the average solenoid temperature by using a temperature sensor to suitably adjust the voltage applied to the coil.

To reduce the mechanical transient settling time following force application to and removal from the transducer, the force to be measured may be applied to the transducer via a damping material or alternatively the transducer components may have damping means built into them.

Many other alterations and modifications of the invention will be apparent to those of skill in the art after having read the foregoing description, and it is understood that this particular description of a preferred embodiment is for purposes of illustration only, and is in no manner intended to be limiting in any way. I intend that the appended claims be interpreted as covering all modifications which fall within the true spirit and scope of my invention.

What is claimed is:

1. A transducing device for use in a force measuring system comprising:
   a first electromechanical force transducing means for converting mechanical energy into electrical energy, said first transducing means including a piezoelectric crystal the resonant frequency of which varies as a function of a force applied thereto;
   transmitting means engaging said first transducing means for transmitting an unknown force thereto; and
   a second electromechanical force transducing means for converting electrical energy into mechanical energy, said second transducing means being coupled to said transmitting means so as to apply a force to said transmitting means in opposition to said unknown force to periodically reduce the magnitude of the force to periodically reduce the magnitude of the force applied to said first transducing means so as to cause the resonant frequency of said crystal to alternate between a reference frequency and a frequency responsive to the application of said unknown force to said crystal.

2. A transducing device as set forth in claim 1, wherein said second transducing means is a solenoid means the armature of which is adapted to apply a force to said transducing means so as to reduce to a predetermined value the unknown force applied to said piezoelectric crystal.

3. A transducing device as set forth in claim 2, wherein said first transducing means includes an oscillator means controlled by said crystal and having an output frequency which varies as a function of the force applied to said crystal.

4. A transducing device as set forth in claim 1, wherein and second transducing means is a piezoelectric element which, when electrically energized, applied a force to said transmitting means so as to reduce to a predetermined amount the unknown force applied to said piezoelectric crystal.

5. A transducing device as set forth in claim 1 wherein said second transducing means is comprised of a magnetostrictive material which, when electrically energized, applies a force to said transmitting means so as to reduce to a predetermined value the unknown force applied to said piezoelectric crystal.

6. A force measuring system comprising:
   a transducing device as recited in claim 1 for providing a force responsive signal when an unknown force is applied thereto with said second transducing means unenergized and a reference signal when said second transducing means is electrically energized;
   power supply means coupled to said second transducing means for causing said reference signal and said force responsive signal to be alternately generated by said first transducing means; and
   signal comparing means responsive to said alternately generated signals and operative to provide an output signal which is indicative of the difference between said reference signal and said force responsive signal and is a direct measurement of the unknown force applied to said transducing device.

7. A force measuring system comprising:
   a transducing device including a first electromechanical force transducing means for converting mechanical energy into electrical energy, said first transducing means including a piezoelectric crystal which normally resonates at a reference frequency, transmitting means engaging said first transducing means for transmitting a force thereto, and second electromechanical force transducing means for periodically causing said transmitting means to transmit an unknown force to be measured to said first transducing means so that said crystal is caused to alternate between said reference frequency and a frequency responsive to said unknown force;
   signal generating means coupled to said second transducing means for causing the periodic energization thereof; and
   frequency comparing means responsive to said first transducing means for comparing said force responsive frequency and said reference frequency and providing an output signal indicative of the difference therebetween and which is a measurement of said unknown force applied to said transducing device.

8. A force measuring system as set forth in claim 7 wherein said transducing device includes an oscillator means the output frequency of which is responsive to said piezoelectric crystal, and said frequency comparing means includes a frequency counting means for determining the difference between said reference frequency and said force responsive frequency.

9. A force measuring system as set forth in claim 8 wherein said second transducing means is a piezoceramic element responsive to said signal generating means for periodically causing said unknown force to be applied to said crystal.

10. A transducing device for use in a force measuring system comprising:
    a rigid base means;
    piezoelectric crystal means having one edge engaging said base means;
    lever means pivotally mounted to said base means and engaging another edge of said crystal means so as to transmit an unknown force applied to said lever means to said crystal means; and
    electromechanical force transducing means for converting electrical energy to mechanical energy mounted to said base means for periodically applying a force to said lever means in a direction opposite to said unknown force applied thereto for reducing the force which is transmitted thereby to said crystal means.

11. A transducing device is recited in claim 10 wherein said electromechanical transducing means is a solenoid means the armature of which engages said lever means to reduce the force applied to said crystal means to a predetermined amount.

12. A transducing device as recited in claim 11 wherein said base member includes a resilient overload means engaged by said crystal means for limiting the force applicable to said crystal means so as to prevent overload damage thereto.

13. A transducing device as recited in claim 12 wherein said lever means includes a force receiving element for receiving said unknown force, the position of said element relative to the pivot point of said lever means being variable to change the percentage of the unknown force applied to said crystal means.

References Cited

UNITED STATES PATENTS

| | | | |
|---|---|---|---|
| 3,373,830 | 3/1968 | Thomson | 177—168 |
| 3,293,911 | 12/1966 | Ziegler | 73—141 |
| 3,233,466 | 2/1966 | Shaw | 73—517 |
| 3,229,531 | 1/1966 | Stiles | 73—517 |
| 3,206,971 | 9/1965 | Felix | 73—141 |
| 3,153,338 | 10/1964 | Kleesattel | 73—67.1 |
| 3,033,043 | 5/1962 | Runft | 73—517 |
| 2,858,124 | 10/1958 | Allen | 177—154 |
| 2,769,867 | 11/1956 | Crownover | 179—110 |
| 2,749,746 | 7/1956 | Wright | 73—88.5 |
| 1,912,213 | 5/1933 | Nicolson | 73—133 |

RICHARD C. QUEISSER, Primary Examiner

J. WHALEN, Assistant Examiner

U.S. Cl. X.R.

73—517, 88.5; 310—8.7